United States Patent [19]

Fujita et al.

[11] 4,174,440
[45] Nov. 13, 1979

[54] IONIC PULLULAN GELS AND PRODUCTION THEREOF

[75] Inventors: Fumio Fujita, Osaka; Kousuke Fukami; Masanori Fujimoto, both of Ibaraki; Tsuneyuki Nagase, Takatsuki, all of Japan

[73] Assignee: Sumitomo Chemical Company, Limited, Osaka, Japan

[21] Appl. No.: 890,505

[22] Filed: Mar. 27, 1978

[30] Foreign Application Priority Data

Apr. 1, 1977 [JP] Japan .................................. 52-37787

[51] Int. Cl.$^2$ ............................................. C07H 15/04
[52] U.S. Cl. ........................................ 536/120; 536/1; 536/117; 536/118; 536/122; 536/119
[58] Field of Search ..................... 536/120, 1

[56] References Cited

U.S. PATENT DOCUMENTS

| 3,275,576 | 9/1966 | Floden et al. | 536/120 |
| 3,277,025 | 10/1966 | Floden et al. | 536/120 |
| 3,960,685 | 6/1976 | Sano et al. | 536/1 |

FOREIGN PATENT DOCUMENTS

| 2627125 | 12/1976 | Fed. Rep. of Germany | 536/1 |
| 7402266 | 8/1974 | France . | |
| 896439 | 5/1962 | United Kingdom . | |
| 911223 | 11/1962 | United Kingdom . | |

OTHER PUBLICATIONS

Chem. Abstract Cit, 171769j, vol. 81, 1974.
Peterson, E. et al., J. Am. Chem. Soc., 78, 751 (1956).
Guthrie, J., Industrial and Engineering Chemistry, 44, 2187 (1956) and 52, 935 (1960).

Primary Examiner—Johnnie R. Brown
Assistant Examiner—Blondel Hazel
Attorney, Agent, or Firm—Stevens, Davis, Miller & Mosher

[57] ABSTRACT

A process for producing ionic pullulan gels which comprises gelation of pullulan by crosslinking and introduction of ionic groups into the resulting pullulan gel, the former comprising reacting pullulan with a bi-functional compound in a solvent in the presence of an alkaline substance, and the latter comprising reacting the resulting pullulan gel with a compound having a carboxyl, sulfonic, phosphoric or amino group in a solvent in the presence of an alkaline substance.

8 Claims, No Drawings

IONIC PULLULAN GELS AND PRODUCTION THEREOF

The present invention relates to a process for producing novel ionic pullulan gels by introduction of an ionic group into pullulan gels. More particularly, it relates to a process for producing novel ionic pullulan gels which comprises preparing pullulan gel from pullulan, swelling and dispersing the resulting gel in water and then reacting the gel with a compound having an ionic group.

It is disclosed in Japanese Patent Publication (unexamined) No. 151281/1976 that water-swellable hydrogels are produced from pullulan. The pullulan gels have a molecular sieve effect and are very useful as materials for separation and purification which are superior in performance, chemical stability and the like. But, pullulan is a neutral substance.

In the use of hydrophilic gels as a material for separation, when compounds to be separation-purified have an ionic group, it is desirable that the gels have a function as an ion exchanger.

As the presently well-known water-swellable gels having an ionic group, there may be mentioned dextran, cellulose and starch substituted with an ionic group such as a diethylaminoethyl or carboxylmethyl group. Dextran is a glucose polymer and its structure is such that glucose units are linked one after another via α-1,6 linkages and the highly reactive hydroxyl group at the C-6 position of the glucose unit takes part in the ether linkage. Consequently, dextran is not well suited for the production of gels having a high level of ion exchange capacity.

Cellulose and starch are high in crystallinity and very poor in solubility in water so that the reaction does not proceed rapidly. Therefore, gels having a high level of ion exchange capacity are hardly obtainable. Further, mechanical strengths of the gels are low upon swelling in water. Accordingly, there is a strong demand for hydrophilic gels having a high ion exchange capacity and high mechanical strengths even upon swelling in water.

On the other hand, pullulan used in the present invention is a linear polymer of maltotriose wherein maltotriose units, a trimer of glucose, are linked one after another via α-1,6 linkage which is different from that of maltotriose. Pullulan has, unlike dextran, a large number of highly reactive hydroxyl groups of primary alcohol at the C-6 positions.

Although pullulan has a glucose unit, its property is different from that of starch or cellulose. That is, pullulan is noncrystalline and is very easily soluble in both cold water and hot water, producing aqueous solutions of extremely low viscosity. Consequently, pullulan reacts with compounds having an ionic group in aqueous solutions more rapidly and with a higher degree of substitution than dextran, cellulose and starch. As a result, there are obtained reaction products having a high level of ion exchange capacity.

Further, pullulan has many desirable properties as hydrophilic gels both in the forms of aqueous solution and solid membrane. The aqueous solution is very stable for a long time without gelation and ageing, and the membrane is very superior in transparency and mechanical strength. In addition, pullulan has a superior membrane-forming ability, no toxicity and good suitability to the living body.

The ionic gels of pullulan are synthesized, for example, by introducing a funtional group into pullulan to obtain ionic pullulans and then converting said ionic pullulans to ionic pullulan gels according to Japanese Patent Publication (unexamined) No. 151281/1976.

For obtaining ionic pullulan from pullulan, however, it is necessary to react pullulan with a compound having an ionic group in an aqueous medium and precipitate the resulting ionic pullulan with a water-miscible organic solvent, followed by purification by the re-precipitation method. This process is therefore troublesome in operation and uneconomical since organic solvents are required. Further, in the subsequent process for obtaining ionic pullulan gels by crosslinking of the ionic pullulan, the following difficulties are encountered: When the ionic pullulan is for example a cationic pullulan containing amino groups, there is a fear of the amino groups losing uniformity of basicity since they take part in the crosslinking reaction; and when the ionic pullulan has anionic groups such as a carboxymethyl group, the viscosity of its aqueous solution becomes extremely high and its concentration in the aqueous solution becomes difficult to increase, as a result of which gels having a low water regain upon swelling are difficult to obtain.

As a result of extensive studies, the inventors found a process for producing ionic pullulan gels which is simple, economical and efficient in the after-treatment of the synthetic reaction. Thus, the inventors arrived at the present invention.

An object of the present invention is to provide a process for producing ionic pullulan gels which comprises reacting pullulan, which is a water-soluble high polymer, with a compound of the formula, $$X_1-R_1-Y$$
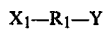

Wherein $X_1$ and Y are each a halogen atom or an epoxy group, and $R_1$ is an aliphatic group having 1 to 30 carbon atoms which may have 1 to 2 hydroxyl groups or a hetero-atom such as an oxygen atom in the carbon chain, in the presence of an alkaline substance, and then reacting the resulting crosslinked water-swellable pullulan gel with a compound of the formula, $$X_2-R_2-Z$$

wherein $X_2$ is a halogen atom or an epoxy group, Z is a carboxyl, sulfonic, phosphoric group or salt thereof, or an amino group of the formula $$-N{<}^{R_3}_{R_4}$$

(in which $R_3$ and $R_4$ are each a hydrogen atom or a methyl, ethyl, hydroxyethyl or phenyl group) or salt thereof, and $R_2$ is a $C_1$-$C_{20}$ hydrocarbon group containing an aliphatic group or/and an aromatic group, which may contain one or more hydroxyl groups or one or more oxygen atoms in the carbon chain, in the presence of an alkaline substance.

According to the process of the present invention, since the synthesized ionic pullulan gels can be used as they are without precipitation with organic solvents and purification by re-precipitation, the process is simple and economical. In addition, the following advantages are obtained: Since there is no necessity of further chemical treatment after ionic groups have been introduced, homogeneous ionic pullulan gels are obtained; and the viscosity of aqueous pullulan solutions, which are a starting material, is so low that the water regain upon swelling can freely be controlled.

Further, it was found that the ionic pullulan gels of the present invention combine superior mechanical strengths upon swelling and superior performances as materials for separation and purification. As to the former, the gels of the present invention are superior to other water-swellable gels having ionic groups. As to the latter, they can widely be used for separation and purification of compounds ranging from low molecular weight to high molecular weight.

The production of pullulan of the present invention is not particularly limited. At present, pullulan can be isolated and recovered as a tacky substance secreted in a culture liquor of a strain belonging to the genus Pullularia.

That is, a strain of the species *Pullularia pullulans* is subjected to the shaking culture at 24° C. for 5 days in a medium containing 10% of starch syrup, 0.5% of $K_2HPO_4$, 0.1% of NaCl, 0.02% of $MgSO_4.7H_2O$, 0.06% of $(NH_4)_2SO_4$ and 0.04% of yeast extract, or to the culture in a medium containing glucose as a carbon source, whereby pullulan is obtained as a tacky substance secreted from the cells into the culture liquor. If necessary, purified pullulan may be obtained by removing the cells from the culture liquor by centrifugation, followed by precipitation-separation with methanol. Pullulan somewhat varies in physical properties depending upon the kind of the strain used. In the present invention, however, pullulan obtained from any strain may be used.

The molecular weight of pullulan used in the present invention is not particularly limited, but preferably it is within the range of $1 \times 10^4$ to $100 \times 10^4$.

As examples of the bi-functional substance used for gelation of pullulan, there may be given compounds of the formula, $X_1-R_1-Y$ (in which $X_1$, $R_1$ and Y are as defined above), for example epichlorohydrin, epibromohydrin, dichlorohydrin, dibromohydrin, 1,2-3,4-diepoxybutane, diglycidyl ether, 1,4-butanediol-di-glycidyl ether, 1,6-hexanediol-di-glycidyl ether, glycerin-di-glycidyl ether, ethylene glycol-di-glycidyl ether, triethylene glycol-di-glycidyl ether, neopentyl glycol-di-glycidyl ether and other homologues thereof. The reaction between pullulan and the bi-functional substance is carried out in the presence of an alkaline substance and a suitable solvent. A preferred solvent is generally water. If necessary, however, other solvents or water-containing mixed solvents may be used provided that they exert no adverse effect on the reaction.

As the alkaline substance, there may be mentioned alkali metal hydroxides such as sodium hydroxide and potassium hydroxide, and in some cases organic amines such as ethylenediamine, diethylenetriamine and triethylamine. Among these substances, sodium hydroxide is particularly preferred.

As to the pullulan gels thus obtained, both their water regain and particle size are not particularly limited. But, for producing the ionic pullulan gels of the present invention, the water regain, which is expressed in the gram number of water absorbed per gram of dry gel, is generally in the range of 1 to 100 g/g, preferably in the range of 1 to 50 g/g; and the particle size is preferably a spherical form of $10\mu$ to $500\mu$ in diameter.

As described above, pullulan gels display a molecular sieve effect on various compounds dissolved in solvents, and they are expected to be useful materials in various fields of desalting, waste water treatment, separation, purification and the like. The shape of the gels used for such purposes is preferably spheres of $10\mu$ to $500\mu$ in diameter. Consequently, it is desirable to produce pullulan gels having a spherical form of $10\mu$ to $500\mu$ in diameter.

The process for producing spherical pullulan gels is not particularly limited. For example, the reaction is carried out in a two-phase system wherein the aqueous pullulan solution is dispersed in a droplet form in a liquid dispersion medium which is immiscible with the aqueous solution and contains a dispersion stabilizer.

As the dispersion medium, there may be mentioned hydrocarbons such as n-hexane, heptane, isoheptane, isooctane, benzene, toluene, xylene, kerosene, cyclohexane, methylcyclohexane and turpentine oil, and halogenated hydrocarbons such as dichloromethane, 1,2-dichloroethane, dichloropentane, monochlorobenzene, o-dichlorobenzene and trichlorobenzene.

As the dispersion stabilizer for dispersing the aqueous pullulan solution in the medium, there may be mentioned high molecular weight polymers which are immiscible with the aqueous solution but soluble in the medium, for example polyvinyl acetate, polyisobutylene, cellulose acetate butylate, polystyrene, polyethyl vinyl ether, polymethyl methacrylate and the like.

Generally, division of an aqueous pullulan solution into particles of required dimension can be achieved sufficiently with the aid of these dispersion stabilizers and stirring of the reaction system. If necessary, detergent type surface active agents may be added.

Introduction of ionic groups into pullulan gels is carried out in the presence of an alkaline compound. This reaction may be expressed as follows: Pullulan gel—OH + $X_2$—$R_2$—Z $\xrightarrow{alkali}$ pullulan gel—O—$R_5$—Z + $X_2^-$ wherein $X_2$, $R_2$ and Z are as defined above, and $R_5$ is a hydrocarbon residue.

When $X_2$ is an epoxy group, no anionic ion is produced. From the equation, it is clear that, when $X_2$ is a halogen atom, the alkali is consumed. While, when $X_2$ is an epoxy group, the alkali acts only as a catalyst. Further, when $X_2$ is an epoxy group, the ring-form linkage of the epoxy compounds is cleft by the action of the hydrogen from the hydroxyl groups of pullulan gels to form a linkage of

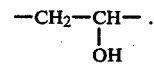

As a result, hydroxyl-containing groups—$R_5$—Z are linked to pullulan gels.

The compounds which are reacted with pullulan gels for introduction of ionic groups are represented by the formula, $X_2$—$R_2$—Z in which $X_2$, $R_2$ and Z are as defined above. As examples of the compounds wherein Z is an amino group, there may be given 2-dimethylaminoethyl chloride, 2-diethylaminoethyl chloride, 2-dimethylaminoisopropyl chloride, 2-bromo-5-diethylaminopentane, 2-diphenylaminoethyl chloride, 2-(N,N-dimethylphenylamino)ethyl chloride, 3-amino-1,2-epoxypropane, 3-dimethylamino-1,2-epoxypropane, 3-diethylamino-1,2-epoxypropane, 3-dibutylamino-1,2-epoxypropane, 3-diphenylamino-1,2-epoxypropane, 3-(N,N-dimethylphenylamino)-1,2-epoxypropane, N,N-

(2,3-epoxypropyl)methylaniline, and inorganic acid salts or alkyl halide salts thereof. As examples of the compounds wherein Z is a carboxyl group, there may be given chloroacetic acid, bromoacetic acid, chloropropionic acid and salts thereof. As examples of the compounds wherein Z is a sulfonic acid group, there may be given chloromethanesulfonic acid, bromoethanesulfonic acid, chloroethanesulfonic acid and salts thereof.

The amount of the compounds, $X_2$—$R_2$—$Z$, used depends upon the required level of ion exchange capacity of the objective ionic pullulan gels, but generally the compounds are used in excess of the stoichiometric amount in order to allow the reaction to proceed rapidly. For example, they are used in an amount of 1/30 to 10 times by mole, preferably 1/30 to 5 times by mole, based on the glucose unit of pullulan. As a result, ionic pullulan gels having an ion exchange capacity of 0.1 to 5 milli-equivalent per gram of pullulan gel are easily obtained.

As the alkaline substance used in this case, there may be mentioned alkali metal hydroxides such as sodium hydroxide and potassium hydroxide, alkaline earth metal hydroxides such as calcium hydroxide and magnesium hydroxide, and in some cases organic amines such as ethylenediamine, diethylenetriamine and triethylamine. Among these substances, sodium hydroxide is particularly preferred.

The amount of alkaline substance added is 0.1 to 50 mole % based on the compounds of the formula, $X_2$—$R_2$—$Z$. When hydrogen halide is however generated during the reaction, the substance is additionally added in a sufficient amount enough to neutralize the hydrogen halide. The reaction solvent is not particularly limited provided that it exerts no adverse effect on the reaction. But, in general, it includes water, dimethylsulfoxide, N,N-dimethylformamide, N,N-dimethylacetamide, benzene, toluene, chloroform and ethyl acetate. Among these, water is particularly preferred.

The reaction conditions are also not particularly restricted. Although a reaction temperature of 200° C. or less is generally suitable, undesirable side reactions would take place in some cases at a temperature exceeding 100° C. Therefore, a reaction temperature of 5° C. to 100° C. is more desirable.

The present invention will be illustrated with reference to the following examples, which are not however to be interpreted as limiting the present invention thereto. In the examples, parts are by weight unless otherwise stated.

EXAMPLE 1

One hundred parts of pullulan having a mean molecular weight of 50,000 were dissolved in 200 parts of water, and 100 parts of a 5 N aqueous sodium hydroxide solution were added thereto to make a homogeneous solution.

This solution was gradually added to a dispersion medium comprising 15 parts of polyvinyl acetate and 800 parts of toluene to disperse the solution in a droplet form. In this operation, a stirrer equipped on the reaction vessel was kept at a rate of 800 rpm. One hour after addition of the aqueous solution, 25 parts of epichlorohydrin were added and the reaction was carried out at 50° C. for 3 hours. After the reaction was finished, the reaction mixture was cooled to room temperature and treated as follows.

The produced gel was deposited at the bottom of the reaction vessel, followed by decantation of the supernatant liquor. The gel was dispersed in 500 parts of toluene and filtered. This operation was repeated three times to remove polyvinyl acetate.

Thereafter, the gel was dispersed in methanol, washed and filtered. The gel was then dispersed in water and neutralized with dilute hydrochloric acid, followed by decantation and filtration. This operation was repeated several times for purification. The gel was dispersed again in water, contacted as it is with ethanol and filtered. The gel was then dried at 70° C. for 24 hours under reduced pressure to obtain 73 parts of a dry gel.

This gel had exactly a spherical particle form and its water regain was 6.0 g/g.

EXAMPLE 2

16.2 Parts of pullulan beads synthesized in Example 1 were dispersed in a solution of 27.6 parts of sodium hydroxide in 150 parts of water. To the resulting solution was added dropwise a solution of 51.6 parts of 2-diethylaminoethyl chloride hydrochloride in 50 parts of water at room temperature over 4 hours with stirring. After the addition was finished, stirring was continued at room temperature for a further 16 hours. After the reaction was finished, hydrochloric acid was added until the pH was 3, followed by thorough washing with water and then methanol. Quantitative analysis by the conductometric titration method showed that amine was 2.8 milliequivalent/g.

EXAMPLE 3

10.0 Parts of pullulan beads synthesized in Example 1 were dispersed in a solution of 55.2 parts of sodium hydroxide in 200 parts of water. To the resulting solution was added dropwise a solution of 103.2 parts of 2-diethylaminoethyl chloride hydrochloride in 100 parts of water at room temperature over 4 hours with stirring. After the addition was finished, stirring was continued at room temperature for further 16 hours. After the reaction was finished, hydrochloric acid was added until the pH was 3, followed by thorough washing with water and then methanol. Quantitative analysis by the conductometric titration method showed that amine was 4.0 milliequivalent/g.

EXAMPLE 4

The procedure was carried out in the same manner as in Example 2 except that 4.0 parts of sodium hydroxide were used in place of 27.6 parts of sodium hydroxide and 55.5 parts of 3-di-n-butylamino-1,2-epoxypropane were used in place of 2-diethylaminoethyl chloride hydrochloride.

Quantitative analysis by the conductometric titration method showed that amine was 2.1 milliequivalent/g.

EXAMPLE 5

The procedure was carried out in the same manner as in Example 2 except that 91.3 parts of 2-bromo-5-diethylaminopentane hydrobromide were used in place of 2-diethylaminoethyl chloride hydrochloride.

Quantitative analysis by the conductometric titration method showed that amine was 2.3 milliequivalent/g.

EXAMPLE 6

The procedure was carried out in the same manner as in Example 2 except that 49.0 parts of 2-dimethylaminoisopropyl chloride hydrochloride were used in place of 2-diethylaminoethyl chloride hydrochloride.

Quantitative analysis by the conductometric titration method showed that amine was 2.5 milliequivalent/g.

EXAMPLE 7

The procedure was carried out in the same manner as in Example 2 except that 4.0 parts of sodium hydroxide were used in place of 27.6 parts of sodium hydroxide and 50 parts of N,N-(2,3-epoxypropyl)methylaniline were used in place of 2-diethylaminoethyl chloride hydrochloride.

Quantitative analysis by the conductometric titration method showed that amine was 1.8 milliequivalent/g.

EXAMPLE 8

A solution of 3 g of sodium hydroxide in 10 ml of water was added to 10 g of the pullulan gel obtained in Example 1, and then 12.5 g of sodium bromomethanesulfonate was further added thereto with stirring. The reaction was carried out at 60° C. for 48 hours, and the produced gel was isolated by filtration. The gel was then washed with water and ethanol and dried under reduced pressure to obtain 12.8 g of a gel. The ion exchange capacity of the gel was 2.33 milliequivalent/g.

EXAMPLE 9

A solution of 7 g of sodium hydroxide in 30 cc of water and 30 g of sodium bromoethanesulfonate were added to 30 g of the pullulan gel obtained in Example 1 with stirring. Nitrogen gas was passed through the reaction mixture. The resulting reaction mixture was heated at 100° C. for 16 hours in a pressure vessel, filtered, washed with ethanol and water, and dried under reduced pressure to obtain 32 g of a gel. The ion exchange capacity of the gel was 1.03 milliequivalent/g.

EXAMPLE 10

A solution of 5 g of sodium hydroxide in 10 cc of water was added to 11 g of the pullulan gel obtained in Example 1, and then 15 g of sodium chloroacetate was added thereto with careful stirring. The resulting mixture was kept at 60° C. for 2 hours with occasional stirring. Thereafter, the reaction mixture was dispersed in water, followed by purification, filtration and drying. The dried product was 17.3 g. The ion exchange capacity of the product was 3.39 milliequivalent/g.

What is claimed is:

1. A process for producing ionic pullulan gels characterized by the steps of (1) reacting pullulan with a compound of the formula, $$X_1-R_1-Y$$

wherein $X_1$ and Y are each a halogen atom or an epoxy group, and $R_1$ is an aliphatic group having 1 to 30 carbon atoms which may have 1 to 2 hydroxyl groups or an oxygen atom in the carbon chain, in the presence of an alkali metal hydroxide or organic amine, and then (2) reacting the resulting crosslinked water-swellable pullulan gel with a compound selected from the group consisting of 2-dimethylaminoethyl chloride, 2-diethylaminoethyl chloride, 2-dimethylaminoisopropyl chloride, 2-bromo-5-diethylaminopentane, 2-diphenylaminoethyl chloride, 2-(N,N-dimethylphenylamino)ethyl chloride, 3-amino-1,2-epoxypropane, 3-dimethylamino-1,2-epoxypropane, 3-diethylamino-1,2-epoxypropane, 3-dibutylamino-1,2-epoxypropane, 3-diphenylamino-1,2-epoxypropane, 3-(N,N-dimethylphenylamino)-1,2-epoxypropane, N,N-(2,3-epoxypropyl)methylaniline, inorganic acid salts or alkyl halide salts thereof, chloroacetic acid, bromoacetic acid, chloropropionic acid, salts thereof, chloromethanesulfonic acid, bromoethanesulfonic acid, chloroethanesulfonic acid and salts thereof in the presence of an alkali metal hydroxide, alkaline earth metal hydroxide or organic amine.

2. A process according to claim 1 wherein said alkali metal hydroxide, alkaline earth metal hydroxide, or organic amine in step (2) is a member selected from the group consisting of sodium hydroxide, potassium hydroxide, ethylenediamine, diethylenetriamine and triethylamine.

3. A process according to claim 1 wherein step (2) is conducted in the presence of a solvent selected from the group consisting of water, dimethylsulfoxide, N,N-dimethylformamide, N,N-dimethylacetamide, benzene, toluene, chloroform and ethyl acetate.

4. A process according to claim 1 wherein said compound in step (2) is used in an amount of 1/30 to 10 times by mole based on the glucose unit of pullulan.

5. A process according to claim 4 wherein the amount is 1/30 to 5 times by mole based on the glucose unit of pullulan.

6. A process according to claim 1 wherein the temperature in step (2) is 200° C. or less.

7. A process according to claim 6 wherein the temperature is 5° to 100° C.

8. An ionic pullulan gel produced according to claim 1.

* * * * *